United States Patent [19]
Dobry

[11] 3,805,595
[45] Apr. 23, 1974

[54] APPARATUS FOR TESTING LEAKAGE

[75] Inventor: Reuven Dobry, Stamford, Conn.

[73] Assignee: Tetley Inc., New York, N.Y.

[22] Filed: Mar. 29, 1972

[21] Appl. No.: 239,068

[52] U.S. Cl. .................................. 73/49.3, 73/52
[51] Int. Cl. ........................................ G01m 3/00
[58] Field of Search .............. 73/49.3, 49.2, 40, 37, 73/49, 146, 146.3, 409, 402, 52

[56] References Cited
UNITED STATES PATENTS

| | | | |
|---|---|---|---|
| 1,377,220 | 5/1921 | Nye | 73/146.2 X |
| 1,724,020 | 8/1929 | Harrington | 73/146.2 X |
| 1,796,489 | 3/1931 | Sturcke | 73/37 X |
| 3,091,114 | 5/1963 | Webster | 73/49.3 |
| 3,399,562 | 9/1968 | Bennett et al. | 73/37 |

FOREIGN PATENTS OR APPLICATIONS 120,920 8/1919 Great Britain ................. 73/146.2

Primary Examiner—Richard C. Queisser
Assistant Examiner—Joseph W. Roskos
Attorney, Agent, or Firm—Lawrence S. Levinson

[57] ABSTRACT

Apparatus for testing leakage in a sealed flexible container comprising a flexible sensing pouch having a chamber which communicates with a liquid manometer, and means for contacting the container being tested and the sensing pouch.

2 Claims, 2 Drawing Figures

PATENTED APR 23 1974

3,805,595

APPARATUS FOR TESTING LEAKAGE

BACKGROUND OF THE INVENTION

It is becoming increasingly commonplace to package foodstuffs, e.g., coffee, in flexible pouches which are flushed with an inert gas, e.g., $N_2$, before being sealed. The detection of slow leaks in such a container has heretofore been carried out in a jar nearly filled with water and connected to a source of vacuum, e.g., from about 380 mm Hg to about 635 mm Hg. The container being tested is immersed in the liquid and held immersed by a bracket. If the container contains one or more leaks, bubbles form at the leaks and rise through the liquid as the vacuum is applied. While simple, this method is messy and even when not leaking, the container is too wet for packaging.

OBJECTS OF THE INVENTION

It is, accordingly, an object of the present invention to provide an improved apparatus for testing a sealed flexible inert gas-flushed container. A further object is to provide an apparatus which permits random on-line inspection. Another object is to provide an apparatus which permits immediate packaging of containers which pass inspection. These and other objects of the present invention will be apparent from the following description.

DETAILED DESCRIPTION

In its simplest form the apparatus of the present invention comprises a flexible sensing pouch formed preferably of plastic film or rubber. The pouch is connected to a water manometer which is preferably open so as to communicate freely with the atmosphere. Means are also provided for maintaining the container being tested in contact with the sensing pouch.

Figure 1:
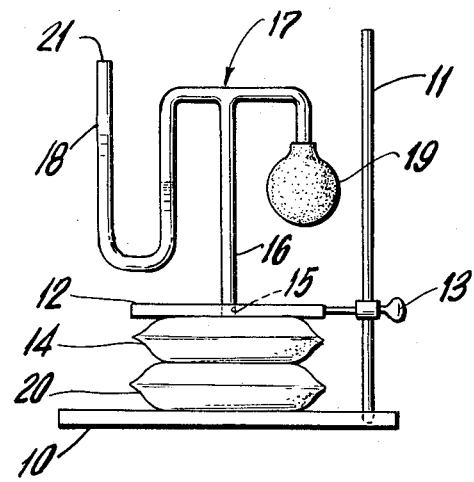
FIG. 1 is an elevation of one type of testing apparatus.

Referring now to the drawings, FIG. 1 shows a stand 10 having an opening to receive a rod 11. A platform 12 is supported from the rod and adapted to move up and down the rod by tightening or loosening screw 13. A flexible sensing pouch 14 is permanently affixed to the bottom of platform 12. The pouch 14 communicates with a T-shaped glass tube 17, with vertical stem 16 passing through a hole 15 in the center of platform 12. One end of tube 17 forms a liquid manometer 18 open to the atmosphere at end 21. The other side of tube 17 is connected to a double check-valved rubber ball 19. The rubber ball is designed to fill the sensing pouch with air to a prescribed level of inflation at ambient pressure; i.e., registering zero pressure on the manometer initially with platform 12 fully raised. A sealed flexible container 20 being tested for leakage is placed on stand 10 and platform 12 lowered until the contact between pouch 14 and container 20 registers a sizable pressure reading on the manometer. The platform is then locked in position by tightening screw 13. If the pressure reading holds constant, the container is tight; if it registers a steady drop, the container is leaking. It is obvious, of course, that pouch 14 and the system it is connected to must themselves be airtight.

Figure 2:
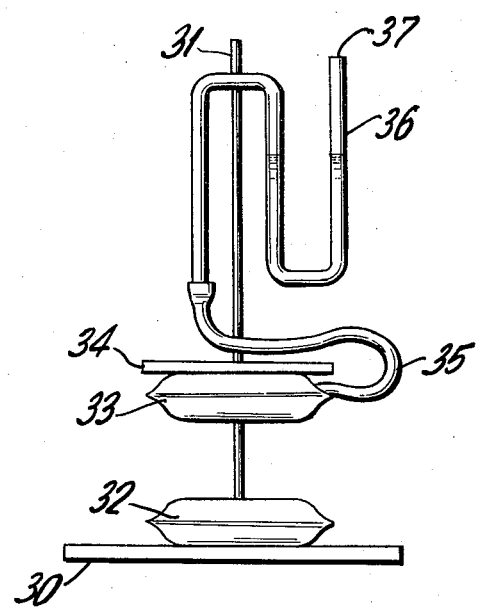
FIG. 2 is an elevation of a second type of testing apparatus.

FIG. 2 shows another embodiment of the invention having stand 30 adapted to receive rod 31. The container 32 being tested rests on the stand while the flexible sensing pouch 33 is suspended from the bottom of platform 34. The sensing pouch 33 is connected by flexible tubing 35 to a water manometer 36. End 37 of the manometer is open to the atmosphere. The operation of this apparatus is similar to that of FIG. 1. In this case, however, the sensing system is inflated to a prescribed level by external means only once (initially) and then maintained sealed thereafter.

It is to be understood that it is also possible to reverse the positions of the sensing pouch and the container being tested, that is, for example, the sensing pouch may be supported on the stand 10 or 30 for the apparatus with the container being tested then being laid on top of the sensing pouch. The movable platform is then moved into position so as to register a pressure on the manometer.

Surfaces in contact with the container being inspected should not be perfectly smooth, as otherwise any points of leakage may be blocked during the test. It is therefore preferred to give the faces of platforms 10 and 30 a corrugated or waffle-like design. For the same reason, it is also advantageous to insert a thin sheet of rigid corrugated material (cardboard and the like) between the sensing pouch and the container being tested.

What is claimed is:

1. Apparatus for testing a sealed, flexible container for leakage comprising a flexible, gas-filled sealed chamber attached to a movable platform, said chamber having a predetermined internal pressure imparted thereto, the chamber having a duct communicating with a liquid manometer and means for maintaining the chamber in compressed surface-to-surface contact with a container being tested for leakage whereby a pressure differential caused by leakage from said container is communicated through said chamber to said manometer.

2. Apparatus according to claim 1 wherein the sealed chamber communicates with an air reservoir adapted to fill the chamber with air.

* * * * *